United States Patent
Zhou et al.

(10) Patent No.: US 9,342,754 B2
(45) Date of Patent: May 17, 2016

(54) IMAGE SEGMENTATION USING BLUR AND COLOR

(71) Applicant: Nokia Corporation, Espoo (FI)

(72) Inventors: Hui Zhou, Sunnyvale, CA (US); Timo Ahonen, Redwood City, CA (US)

(73) Assignee: Nokia Technologies Oy, Espoo (FI)

( * ) Notice: Subject to any disclaimer, the term of this patent is extended or adjusted under 35 U.S.C. 154(b) by 80 days.

(21) Appl. No.: 14/247,453

(22) Filed: Apr. 8, 2014

(65) Prior Publication Data

US 2015/0287209 A1   Oct. 8, 2015

(51) Int. Cl.
*G06K 9/34* (2006.01)
*G06K 9/52* (2006.01)
*G06K 9/46* (2006.01)
*G06T 7/00* (2006.01)

(52) U.S. Cl.
CPC ............ *G06K 9/52* (2013.01); *G06K 9/4652* (2013.01); *G06T 7/0069* (2013.01); *G06T 7/0081* (2013.01); *G06K 2009/4666* (2013.01); *G06T 2207/10024* (2013.01)

(58) Field of Classification Search
CPC ..... G06T 7/0081; G06T 7/0097; G06T 7/408; G06T 2207/10004; G06T 2207/10024; G06T 2207/20076; G06T 2207/20144
USPC ................................................ 382/164, 173
See application file for complete search history.

(56) References Cited

U.S. PATENT DOCUMENTS

| | | | |
|---|---|---|---|
| 5,848,185 A * | 12/1998 | Koga et al. | 382/173 |
| 8,175,379 B2 * | 5/2012 | Wang et al. | 382/164 |
| 8,472,718 B2 | 6/2013 | Lv et al. | 382/173 |
| 8,503,801 B2 * | 8/2013 | Schiller et al. | 382/228 |
| 2005/0271273 A1 | 12/2005 | Blake et al. | |
| 2013/0107010 A1 | 5/2013 | Hoiem et al. | 348/47 |
| 2013/0127824 A1 | 5/2013 | Cohen et al. | 345/419 |

FOREIGN PATENT DOCUMENTS

| | | |
|---|---|---|
| CN | 103208123 A | 7/2013 |
| EP | 2 637 139 A1 | 9/2013 |

OTHER PUBLICATIONS

Couzinie-Dewy, Florent, et al., "Learning to Estimate and Remove Non-uniform Image Blur", IEEE Conference on Computer Vision and Pattern Recognition, 2013, pp. 1075-1082.
Perazzi, Federico, et al., "Saliency Filters: Contrast Based Filtering for Salient Region Detection", Stamford University, 2012, 8 pgs.
Jiang, Peng, et al., "Salient Region Detection by UFO: Uniqueness, Focusness and Ojbectness", ICCV, 2013, pp. 1976-1983.
Levinshtein, Alex, "Low and Mid-Level Shape Priors for Image Segmentation", 2010, 169 pgs.
Srihar, Sargur, "Markov Networks in Computer Vision", 23 pgs.
Zhu, Xiang, et al., "Estimating Spatially Varying Defocus Blur From a Single Image", IEEE Transactions on Image Processing, vol. 22, No. 12, Dec. 2013, pp. 4879-4891.

(Continued)

*Primary Examiner* — Kanjibhai Patel
(74) *Attorney, Agent, or Firm* — Harrington & Smith

(57) ABSTRACT

A method including segmenting an image into different segments, where the segmenting is based at least partially upon an estimate of blur of areas of the image; and changing the segmenting of two or more of the sections based, at least partially, upon color in the image.

16 Claims, 6 Drawing Sheets

(56) References Cited

OTHER PUBLICATIONS

Boykov Yuri, et al., "Fast Approximate Energy Minimization via Graph Cuts", IEEE Transactions on Pattern Analysis and Machine Intelligence, vol. 23, No. 11, Nov. 2001, pp. 1222-1239.

Swain, Cassandra, et al., "Defocus-Based Image Segmentation", International Conference on Acoustics, Speech, and Signal Processing, vol. 4, Jan. 1, 1995, 4 pgs.

Saxena, Ashutosh, et al., "Make3D: Depth Perception from a Single Still Image", http://www.cs.cornell.edu/!asaxena/reconstruction3d/saxena_depthperception_aaai08.pdf; Jan. 1, 2008, 6 pgs.

\* cited by examiner

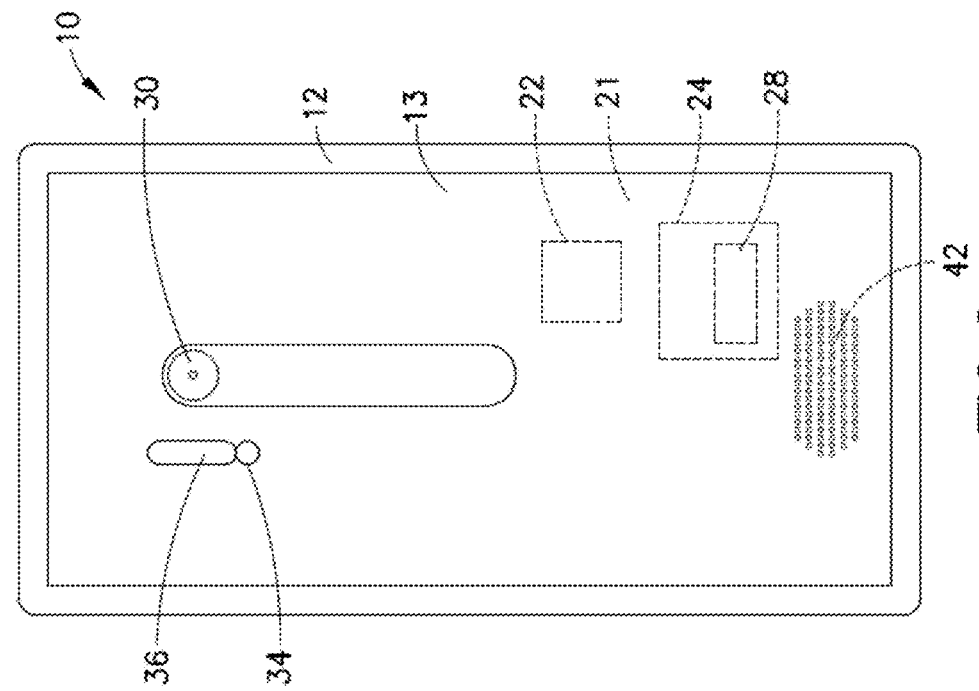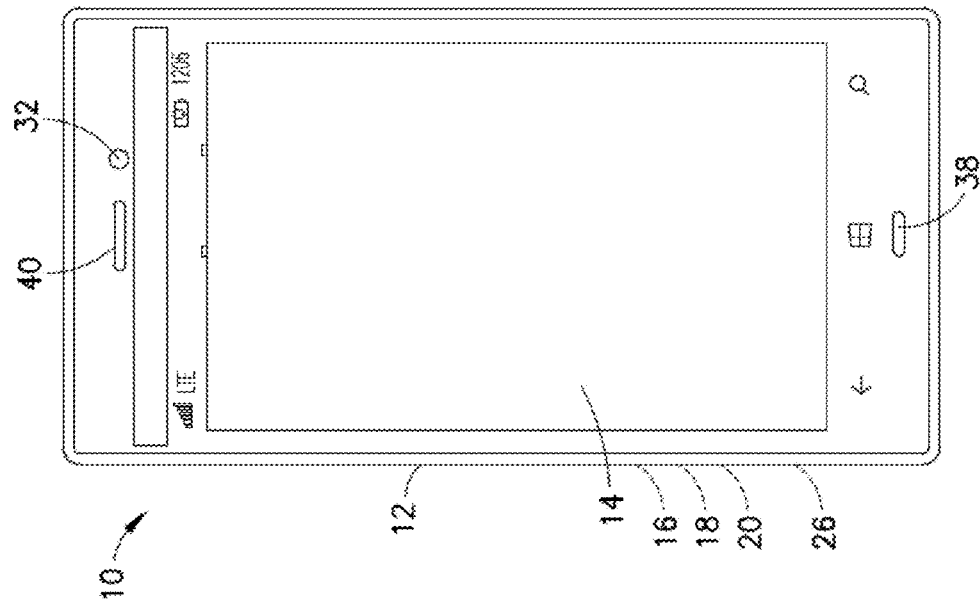

IMAGE SEGMENTATION USING BLUR AND COLOR

BACKGROUND

1. Technical Field

The exemplary and non-limiting embodiments relate generally to imaging and, more particularly, to image segmentation.

2. Brief Description of Prior Developments

In computer vision and digital imagery, image segmentation is the process of partitioning a digital image into multiple segments (sets of pixels in which all pixels in the same set share certain visual characteristic). Image segmentation is typically used to locate objects and boundaries (lines, curves, etc.) in images. The result of image segmentation is a set of segments that collectively cover the entire image.

SUMMARY

The following summary is merely intended to be exemplary. The summary is not intended to limit the scope of the claims.

In accordance with one aspect, an example method comprises segmenting an image into different segments, where the segmenting is based at least partially upon an estimate of blur of areas of the image; and changing the segmenting of two or more of the sections based, at least partially, upon color in the image.

In accordance with another aspect, an example embodiment is provided in an apparatus comprising at least one processor; and at least one non-transitory memory including computer program code, the at least one memory and the computer program code configured, with the at least one processor, cause the apparatus at least to: segment an image into different segments, where segmenting of the image into different segments is based at least partially upon an estimate of blur of areas of the image; and change the segmenting of two or more of the sections based, at least partially, upon color in the image.

In accordance with another aspect, an example embodiment is provided in a non-transitory program storage device readable by a machine, tangibly embodying a program of instructions executable by the machine for performing operations, the operations comprising: segmenting an image into different segments, where the segmenting is based at least partially upon an estimate of blur of areas of the image; and changing the segmenting of two or more of the sections based, at least partially, upon color in the image.

BRIEF DESCRIPTION OF THE DRAWINGS

The foregoing aspects and other features are explained in the following description, taken in connection with the accompanying drawings, wherein:

FIG. 1 is a front view of an example embodiment of an apparatus comprising features as described herein;

FIG. 2 is a rear view of the apparatus shown in FIG. 1;

DETAILED DESCRIPTION OF EMBODIMENTS

Figure 3:
FIG. 3 is an image illustrating non-uniform blur.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone, such as a digital camera or video recorder, a tablet computer, or a gaming handset for example.

Referring also to FIG. 2, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as a microphone 38. In an alternate example the apparatus may comprise more than one microphone. The apparatus 10 includes a sound transducer provided as an earpiece 40, and a sound transducer provided as a speaker 42. More or less than one speaker may be provided.

Features as described herein may be used with automatic scene segmentation of a color image having non-uniform blurs, such as an image taken with the camera 3 for example. However, the features as described herein are in the fields of imaging, image blur estimation, and image segmentation and are not limited to use in a smartphone. Given an image, scene segmentation may be used to extract logically meaningful regions (for example, foreground and background) from the image. This is a very challenging task since no semantic information is available. Most image segmentation approaches require user input. As explained herein, if further information is provided, for example given an image with non-uniform blurs, it may be possible to use blur cues to assist automatic segmentation. In one example, one may assume that the foreground of the image is focused and the background is out-of-focus (or vice versa), such that the classification problem of foreground/background can be assisted as blur/non-blur segmentation. As an example, an image with non-uniform blurs is shown in FIG. 3 where the foreground is in-focus and the background is out-of-focus. In this example the in-focus foreground comprises the toy airplane 60 and the out-of-focus background includes the newspaper 62.

For only one single image with non-uniform blurs, judging a pixel whether it belongs to foreground or background is difficult. This is mainly due to the following challenges:

Reliable blur estimation—per pixel based blur measurement estimation is not reliable. Usually a local window is chosen to calculate a specific pixel's blur. The size of the window has impact on the blur estimation. The blur measure calculation is not reliable either the chosen window is too large or too small.

Classification ambiguity—for a specific region with a small blur estimated, it is hard to differentiate if the small blur is caused by out-of-focus or is the actual weak-contrast content. Similarly, it is hard to tell if the sharpness is because of the focus or the strong-contrast content. Other information besides blur should be used to improve the blur-based segmentation result.

With features as described herein, example methods may comprise:

Adaptive thresholding of a blur histogram to be indirectly used for a blur-based segmentation. The blur histogram may be defined as a cost data term in an alpha expansion.

Pixels grouped together to form super-pixels (a set of connected pixels with similar colors) in order to:
  improve blur estimation robustness—the size of super-pixels is determined adaptively based on image content, thus no local window size needs to be chosen for blur estimation;
  improve computational efficiency.

Super-pixel based color probability may be used for further segmentation improvement.

Figure 4:
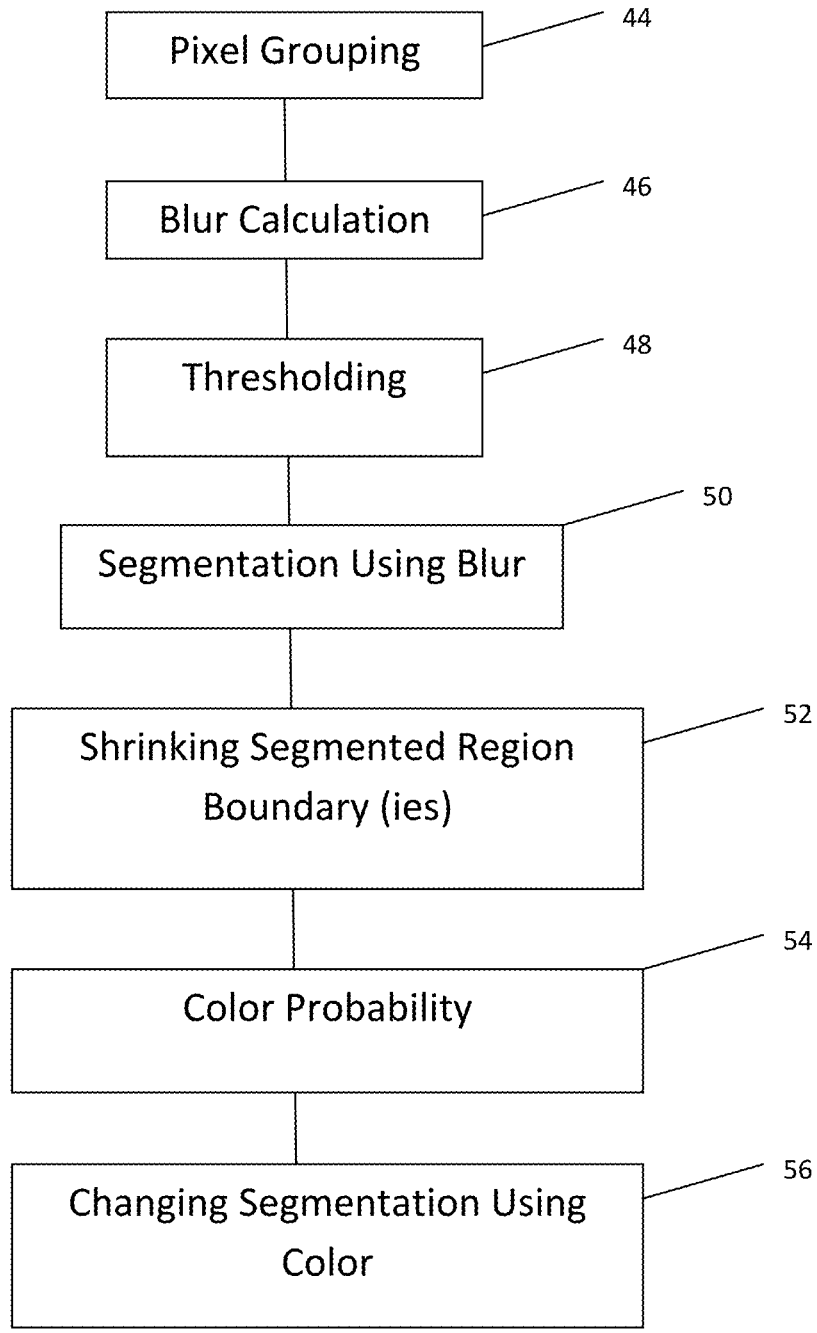
FIG. 4 is a diagram illustrating an example method.

FIG. 4 shows a flow chart of one example method. The steps in this example, as described in further detail below, generally comprise grouping pixels as illustrated by block 44, determining or estimating a blur as illustrated by block 46, performing a threshold calculation as illustrated by block 48, performing a segmentation using the determined or estimated blur as illustrated by block 50, shrinking a segmented region boundary as illustrated by block 52, calculating a color probability as illustrated by block 54 and changing the segmentation using the color probability as illustrated by block 56. In alternative methods, additional steps may be performed, and/or some of these steps may be modified, adjusted or omitted. The below detailed further explanation is merely exemplary, and should not be considered as limiting.

Pixel Grouping 44

To improve the reliability of blur estimation and computational efficiency, clustering of the original image (or decimated version of the original image if necessary) may be applied to form super-pixels. Well-known super-pixel algorithms, such as Simple Linear Iterative Clustering (SLIC) for example, may be used at this step. In each super pixel, besides its label ID, geometry center, its neighbors, mean color values for each color channel (L, a, b) may be calculated. If the image is not in Lab color space, it may be converted to Lab color space first. Below shows an example of the information contained in a super pixel:

```
Super pixel {
    ID
    geometry center (x,y)
    number of neighboring super pixels
    list of neighboring super pixel IDs
    mean color L
    mean color a
    mean color b
}
```

Figure 5:
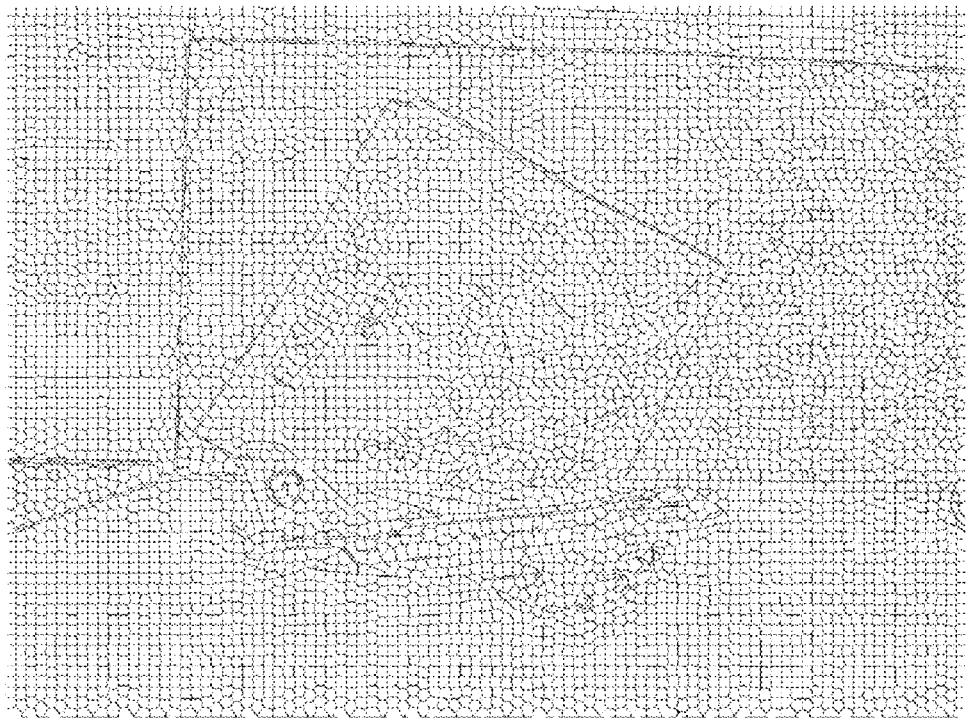
FIG. 5 is a map illustrating super-pixels generated from the image shown in FIG. 3.

FIG. 5 shows an example of a grouped super-pixel result from the image shown in FIG. 3.

Calculating Super-Pixel Blur Measurement 46

After the super-pixels are formed, the blur measurement of the super-pixels may be calculated. The blur of each super-pixel may be defined in any suitable way such as, for example, the maximum pixel blur of all the pixels inside the super-pixel, the sum of the blur of all the pixels inside the super-pixel, or the mean blur (the mean of the blur of all the pixels inside the super-pixel), etc. In this example, for super pixel Sp the mean blur of all the super pixel neighbors of Sp was calculated, and then the maximum of the mean blur was picked as the blur measurement of the super-pixel Sp. The information contained in a super pixel includes a blur measure br:

```
Super pixel {
    ID
    geometry center (x,y)
    number of neighboring super pixels
    list of neighboring super pixel IDs
    mean color L
    mean color a
    mean color b
    blur measure br
}
```

Figure 6:
FIG. 6 is an image illustrating blur measurement of pixels of the image shown in FIG. 3.
Figure 7:
FIG. 7 is an image illustrating blur measurement of super-pixels shown in FIG. 5 for the image shown in FIG. 3.

FIGS. 6 and 7 show examples of the blur measure for each pixel and each super-pixel, respectively, from the image shown in FIG. 3.

Segmentation Using Blur Via Combining Adaptive Thresholding into Energy Minimization 50, 48

Figure 8:
FIG. 8 is a result illustrating conventional segmentation of the image shown in FIG. 3 using thresholding.

For each image, every super-pixel may have a blur measure. A simple segmentation algorithm may use thresholding; content adaptive thresholding selection for example. Thresholding is perhaps the simplest method of image segmentation. From a grayscale image, thresholding can be used to create binary images. For example, Otsu's algorithm (maximum variance), described in "N. Otsu, A threshold selection method from gray-level histograms, IEEE Trans. Sys., Man. Cyber. 9 (1): 62-66, 1979", is a histogram based adaptive algorithm. However, histogram based algorithms in the past failed to consider local information in which neighboring pixels may have strong correlation on the segmentation result. FIG. 8 shows a segmentation result using thresholding of the image shown in FIG. 3.

To achieve a better segmentation result than that shown in FIG. 8, an alpha-expansion algorithm, such as described in "Boykov, Y. et al., Fast approximate energy minimization via graph cuts, IEEE Transactions on Pattern Analysis and Machine Intelligence, (Volume: 23, Issue: 11)" for example, may be applied to label which super-pixel belongs to which blur layer. An alpha-expansion algorithm is described for example in U.S. patent publication No. 2013/0107010 A1 which is hereby incorporated by reference in its entirety. In the alpha-expansion algorithm, data cost is defined as how the blur measure of the super pixel compares against the selected adaptive threshold (T):

D=L*k if Blur >T
D=L*(1−k) otherwise.

Where, L is the pre-defined weight balancing the data term and binary term, k is the pre-defined weight balancing the contribution of over-threshold and below-threshold. The threshold T is determined by an adaptive threshold section algorithm, such as Otsu's algorithm for example.

The Binary cost may be defined as Potts model:
B=m if label_a is not the same as label_b
B=0 otherwise.

Where m is the pre-defined weight control the smoothness. It should be noted that other terms encouraging the smoothness of neighbor labeling can be used to define binary term.

Figure 9:
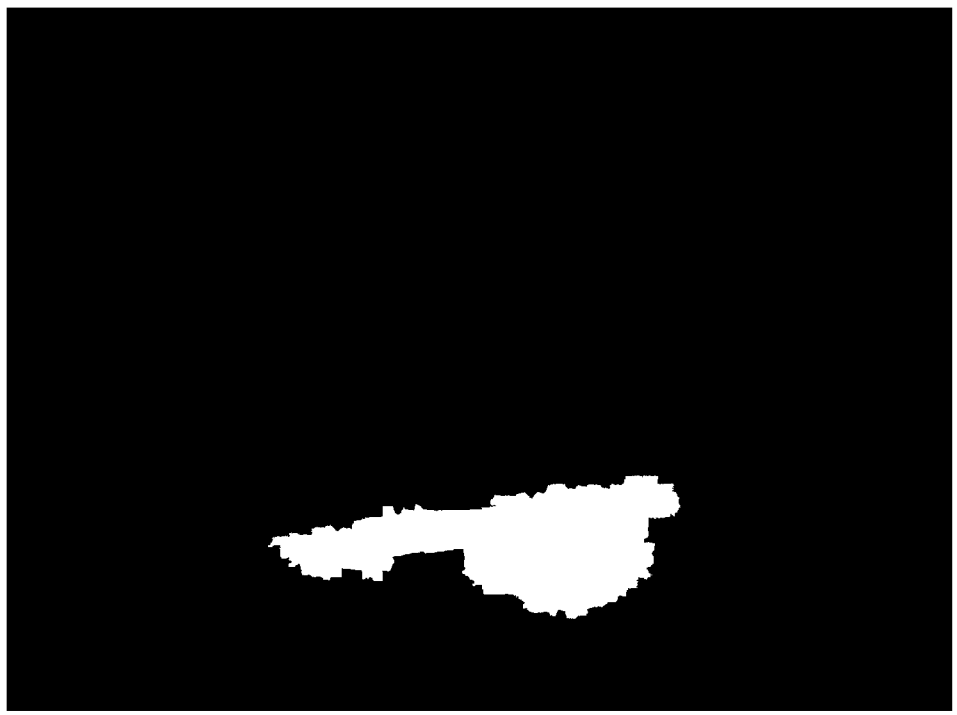
FIG. 9 is a result illustrating segmentation of the image shown in FIG. 3 using alpha expansion.

A swap move algorithm may comprise, for example:

1. Start with an arbitrary labeling f
2. Set success := 0
3. For each pair of labels {α-β} ⊃ L
    3.1. Find f̂ = arg min E (f') among f' within one α-β swap of f
    3.2. If E(f̂) < E(f), set f := f̂
    and success := 1
4. If success = 1 goto 2
5. Return f An expansion move algorithm may comprise, for example:

1. Start with an arbitrary labeling f
2. Set success := 0
3. For each label α∈ L
    3.1. Find f̂ = arg min E(f') among f' within one α-expansion of f
    3.2. If E(f̂) < E(f), set f := f̂
    and success := 1
4. If success = 1 goto 2
5. Return f This process results in a segmentation map, in which each super-pixel has one unique label (e.g., 0 for foreground and 1 for background) indicating which layer it belongs to. FIG. 9 shows an example of such a segmentation map for the image in FIG. 3. As comparison against the segmentation map of FIG. 8, it is obvious that the result in FIG. 9 is more compact. This is due to the binary term in alpha expansion to encourage smoothness.

In a general case, an image may contain more than two (2) layers (foreground and background). This may be addressed with a recursive analysis. The problem can be first considered as a binary problem of foreground against another layer LA, which can be further processed as foreground against another. Thus, recursively the problem may be converted to a series of binary (foreground/background) problems. Eventually, each super-pixel may have one unique label indicating the different uniform blur layer to which it belongs. For simplicity, in our description, we assume the problem is a binary problem where foreground is in-focus and background is out-of-focus.

Shrinking Segmented Region Border 52

Figure 10:
FIG. 10 is a result illustrating shrinking being applied.

Within the image, a super-pixel may be labeled as foreground if the super-pixel belongs to one layer; and another super-pixel may be labeled as background if it belongs to other layers. However, it is common that the blur segmentation result may cross over the foreground/background region because of the blur ambiguity along the depth border. To account for this issue, shrinking may be applied for each foreground super-pixel and background super-pixel if it is located along the boundary between the foreground and the background. It should be noted that the shrinking process can be omitted. Alternatively, the shrinking process may be repeated multiple times. FIG. 10 shows an example of the shrinking result. The remaining foreground super-pixels may be considered as foreground, and the remaining background super-pixels may be considered as background to calculate color probability in the next step.

Calculate Color Probability 54

The color density functions of all foreground and background super-pixels may be calculated as foreground and background probability. If the set of foreground pixels are labeled as F and the set of background pixels are labeled as B, the likelihood of c_Sp super pixel Sp with its color c (where c=(L, a, b) that is belonging to F will be:

$$Pr(c\_Sp|F)/(Pr(c\_Sp|F)+Pr(c\_Sp|B))$$

where Pr(c_Sp|F) is the foreground color Probability Density Function, which may be estimated via a Fast Gauss Transform. The same process may be applied for the background color probability. An example of a Fast Gauss Transform is described in "C. Yang et al, Improved fast gauss transform and efficient kernel density estimation, IEEE International Conference on Computer Vision, 2003, pp. 664-671" for example. Use of a Fast Gauss Transform is described in U.S. patent publication No. 2013/0127824 A1 for example which is hereby incorporated by reference in its entirety.

Improve Segmentation Using Color 56

Figure 11:
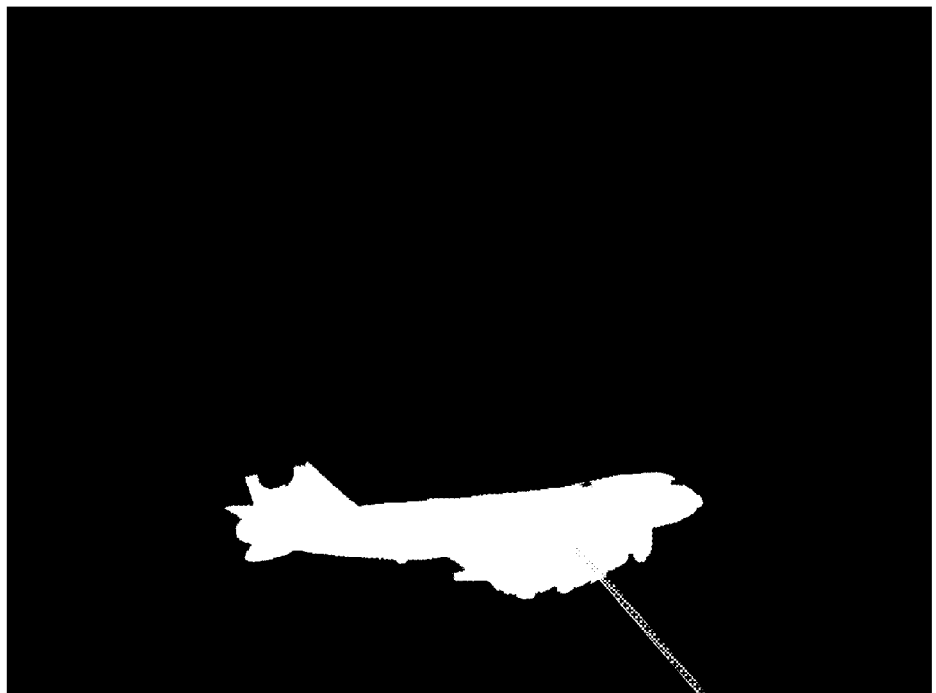
FIG. 11 is a segmentation result illustrating change of the segmentation shown in FIG. 10 based upon color.

Similar as the segmentation on blur in step 50, a graph cut algorithm may be used to do foreground and background segmentation on the two color distributions. This time, the data cost is the color distribution and the binary cost may still be Pott's model as well. The graph cut algorithm may be, for example, similar to the method described in "Y. Y. Boykov and M. P. Jolly, Interactive graph cuts for optimal boundary and region segmentation of objects in n-d images," in ICCV01, 2001, pp 105-112", but in our case, we do not require user input. FIG. 11 shows the final result after 56; after the graph cut algorithm has been used for changing the segmentation of FIG. 10. As can be seen, the in-focus airplane 60 of FIG. 3 is easily discernible in the segmented area 60'.

Although the method has been described above as an automatic segmentation approach, a user's input can be easily and conveniently combined into the process. This is because we can build the graph in a different way by considering the user input and then apply graph-cut algorithm on it. In addition, the user input can be added iteratively in several steps rather than once. Either the blur segmentation 46 or the color segmentation 56 may have a capability to combine the user input as hard constraints in the framework.

With features as described herein, automatic segmentation may be provided with no user input required. However user input can be easily combined into the framework. With features as described herein, pixels may be grouped together into super-pixels to improve the robustness and improve the computational efficiency. With features as described herein, color based segmentation may be used to improve segmentation from a previous method.

An example method may comprise segmenting an image into different segments, where the segmenting is based at least partially upon an estimate of blur of areas of the image; and changing the segmenting of two or more of the sections based, at least partially, upon color in the image.

Pixels of the image may be grouped together to form super-pixels, and where at least some of the areas having the estimate of blur are a respective one of the super-pixels. The estimate of blur for a respective one of the super-pixels may comprise one or more of a maximum pixel blur of all pixels inside the super-pixel, a sum of the blur of all the pixels inside the super-pixel, a mean of the blur of all the pixels inside the super-pixel. The segmenting may comprise applying thresholding to a first segmentation to produce a second segmentation. The segmenting may form a map comprising at least a first blur layer of the areas based upon the estimate of blur and a different second blur layer of the areas based upon the estimate of blur, and the method further comprises using shrinking along one or more boundaries between the first and second layers on the map. The method may further comprise calculating color probability of the areas, where the calculation of the color probability is used for the changing of the segmenting. The segmenting and/or the changing may comprise use of user input from a user. The changing, based upon color, may comprise use of a graph cut algorithm to the different segments.

An example embodiment may be provided in an apparatus comprising at least one processor; and at least one non-transitory memory including computer program code, the at least one memory and the computer program code configured, with the at least one processor, cause the apparatus at least to: segment an image into different segments, where segmenting of the image into different segments is based at least partially upon an estimate of blur of areas of the image; and change the segmenting of two or more of the sections based, at least partially, upon color in the image.

Pixels of the image may be grouped together to form super-pixels, and where at least some of the areas having the estimate of blur are a respective one of the super-pixels. The estimate of blur for a respective one of the super-pixels may comprise one or more of: a maximum pixel blur of all pixels inside the super-pixel, a sum of the blur of all the pixels inside the super-pixel, a mean of the blur of all the pixels inside the super-pixel. The segment of the image may comprise applying thresholding to a first segmentation to produce a second segmentation. The segment of the image may form a map comprising at least a first blur layer of the areas based upon the estimate of blur and a different second blur layer of the areas based upon the estimate of blur, and the method further comprises using shrinking along one or more boundaries between the first and second layers on the map. The at least one memory and the computer program code may be configured, with the at least one processor, to cause the apparatus to calculate color probability of the areas, where the calculation of the color probability is used for the changing of the segmenting. The segment of the image and/or the change of the segment of the image may comprise use of user input from a user. The change of the segment of the image, based upon color, may comprise the at least one memory and the computer program code being configured, with the at least one processor, to use of a graph cut algorithm to the different segments. The apparatus may further comprise at least one printed wiring board having the at least one memory and the at least one processor thereon; an electrical display connected to the at least one printed wiring board; a receiver connected to the at least one printed wiring board; a transmitter connected to the at least one printed wiring board; and a battery connected to the at least one printed wiring board.

An example embodiment may be provided in a non-transitory program storage device, such as memory 24 for example, readable by a machine, such as 10 for example, tangibly embodying a program of instructions executable by the machine for performing operations, the operations comprising: segmenting an image into different segments, where the segmenting is based at least partially upon an estimate of blur of areas of the image; and changing the segmenting of two or more of the sections based, at least partially, upon color in the image.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example embodiment may be provided in an apparatus comprising means for segmenting an image into different segments, where segmenting of the image into different segments is based at least partially upon an estimate of blur of areas of the image; and means for changing the segmenting of two or more of the sections based, at least partially, upon color in the image.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   grouping, by at least one processor, at least some pixels of an image together to form a plurality of super-pixels;
   segmenting, by the at least one processor, the image into different segments, where the segmenting is based at least partially upon an estimate of blur of respective ones of the super-pixels, where at least two of the segments each comprise a plurality of the super-pixels;
   changing, by the at least one processor, the segmenting of two or more of the segments based, at least partially, upon color in the image, and
   calculating, by the at least one processor, color probability of the super-pixels, where the calculation of the color probability is used for the changing of the segmenting.

2. A method as in claim 1 where the estimate of blur for a respective one of the super-pixels comprises one or more of:
   a maximum pixel blur of all pixels inside the super-pixel,
   a sum of the blur of all the pixels inside the super-pixel,
   a mean of the blur of all the pixels inside the super-pixel.

3. A method as in claim 1 where the segmenting comprises applying thresholding to a first segmentation to produce a second segmentation.

4. A method as in claim 3 where the thresholding comprises use of alpha-expansion algorithm, where data cost is defined as how a blur measure of the respective super-pixels compares against the selected adaptive threshold (T).

5. A method as in claim 1 where the segmenting and/or the changing comprises use of user input from a user.

6. A method as in claim 1 where the changing, based upon color, comprises use of a graph cut algorithm to the different segments.

7. A method comprising:
- segmenting, by at least one processor, an image into different segments, where the segmenting is based at least partially upon an estimate of blur of areas of the image; and
- changing, by the at least one processor, the segmenting of two or more of the segments based, at least partially, upon color in the image,
- where the segmenting forms a map comprising at least a first blur layer of the areas based upon the estimate of blur and a different second blur layer of the areas based upon the estimate of blur, and the method further comprises using shrinking along one or more boundaries between the first and second layers on the map.

8. An apparatus comprising
- at least one processor; and
- at least one non-transitory memory including computer program code, the at least one memory and the computer program code configured, with the at least one processor, cause the apparatus at least to:
- group at least some pixels of an image together to form a plurality of super-pixels;
- segment the image into different segments, where segmenting of the image into different segments is based at least partially upon an estimate of blur of respective ones of the super-pixels, where at least two of the segments each comprise a plurality of the super-pixels;
- change the segmenting of two or more of the segments based, at least partially, upon color in the image; and
- calculate color probability of the super-pixels, where the calculation of the color probability is used for the changing of the segmenting.

9. An apparatus as claimed in claim 8 where the estimate of blur for a respective one of the super-pixels comprises one or more of:
- a maximum pixel blur of all pixels inside the super-pixel,
- a sum of the blur of all the pixels inside the super-pixel,
- a mean of the blur of all the pixels inside the super-pixel.

10. An apparatus as claimed in claim 8 where the segment of the image comprises applying thresholding to a first segmentation to produce a second segmentation.

11. An apparatus as claimed in claim 10 where the at least one memory and the computer program code are configured, with the at least one processor, to cause the apparatus to use of alpha-expansion algorithm for the thresholding, where data cost is defined as how a blur measure of the respective super-pixels compares against the selected adaptive threshold (T).

12. An apparatus as claimed in claim 8 where the segment of the image and/or the change of the segment of the image comprises use of user input from a user.

13. An apparatus as claimed in claim 8 where the change of the segment of the image, based upon color, comprises the at least one memory and the computer program code being configured, with the at least one processor, to use of a graph cut algorithm to the different segments.

14. An apparatus as claimed in claim 8 further comprising:
- at least one printed wiring board having the at least one memory and the at least one processor thereon;
- an electrical display connected to the at least one printed wiring board;
- a receiver connected to the at least one printed wiring board;
- a transmitter connected to the at least one printed wiring board; and
- a battery connected to the at least one printed wiring board.

15. An apparatus comprising:
- at least one processor; and
- at least one non-transitory memory including computer program code, the at least one memory and the computer program code configured, with the at least one processor, cause the apparatus at least to:
- segment an image into different segments, where segmenting of the image into different segments is based at least partially upon an estimate of blur of areas of the image; and
- change the segmenting of two or more of the segments based, at least partially, upon color in the image,
- where the segment of the image forms a map comprising at least a first blur layer of the areas based upon the estimate of blur and a different second blur layer of the areas based upon the estimate of blur, and the method further comprises using shrinking along one or more boundaries between the first and second layers on the map.

16. A non-transitory program storage device readable by a machine, tangibly embodying a program of instructions executable by the machine for performing operations, the operations comprising:
- grouping at least some pixels of an image together to form a plurality of super pixels;
- segmenting the image into different segments, where the segmenting is based at least partially upon an estimate of blur of respective ones of the super-pixels, where at least two of the segments each comprise a plurality of the super-pixels;
- changing the segmenting of two or more of the segments based, at least partially, upon color in the image; and
- calculating color probability of the super-pixels, where the calculation of the color probability is used for the changing of the segmenting.

* * * * *